Jan. 13, 1959 A. BRANDT 2,869,005
HEAVY CURRENT CONTACT CONVERTER SYSTEMS
Filed June 11, 1956 2 Sheets-Sheet 2
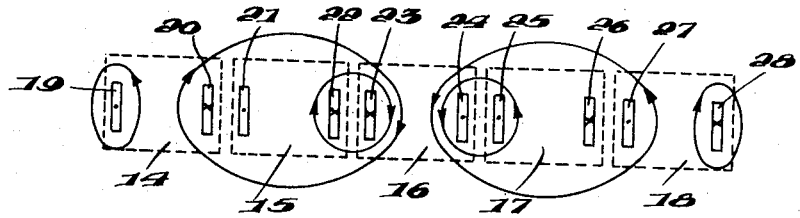
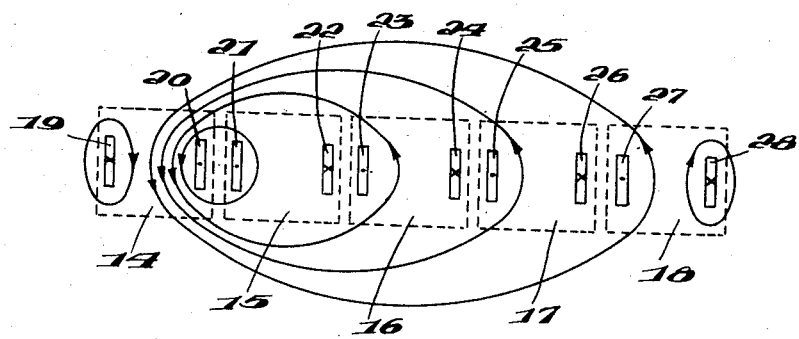
INVENTOR
Armand Brandt,
BY Pierce, Scheffler & Parker
his ATTORNEYS

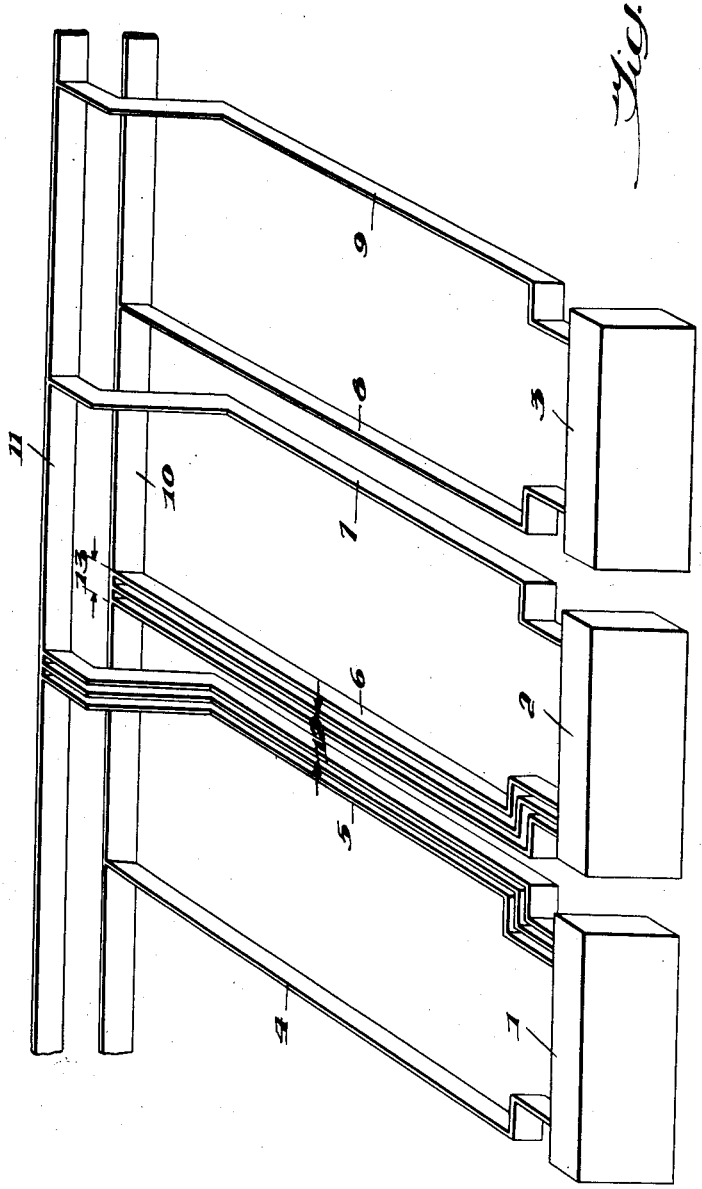

United States Patent Office 2,869,005
Patented Jan. 13, 1959

2,869,005

HEAVY CURRENT CONTACT CONVERTER SYSTEMS

Armand Brandt, Wettingen, Switzerland, assignor to Aktiengesellschaft Brown, Boveri & Cie, Baden, Switzerland, a joint stock company Application June 11, 1956, Serial No. 590,601

Claims priority, application Switzerland June 23, 1955

2 Claims. (Cl. 307—147)

This invention relates generally to a direct-current generating plant having a plurality of parallel-connected contact converter groups, and more particularly to a structural arrangement of elements in such a plant which will automatically attenuate the short-circuit reversing currents which tend to flow from the load mains into a faulty converter unit.

In heavy current plants, for example, electrolysis plants, a plurality of parallel-connected contact converter or rectifier units are provided for supplying D. C. power to the main D. C. collector bars. Should one of the converter units become defective for any reason, short-circuit reverse currents tend to flow from the properly functioning converter units through the collector mains into the secondary of the defective converter, thus severely damaging the same. In the past it has been common to provide safety switching means for protecting each converter against these large short-circuit reverse currents. The larger the number of units connected in parallel with the D. C. mains, the greater will be the value of the short-circuit currents. In many cases the switching operation of the protective switches is not fast enough to prevent certain amounts of the heavy reversing currents from reaching the defective converter.

In order to attenuate the short-circuiting currents it has been found that small impedances in the conductor bars leading from the converter units to the D. C. mains will suffice when the installation carries heavy current at low voltages. Since the switch breaking is effected within a relatively short time, the inductances may be utilized to diminish the short-circuit overload in the defective circuit which is to be opened by the protective switch without adversely affecting the normal current supply in the D. C. mains.

According to the invention, it is suggested to increase the inductivity of the conductor bars by arranging the adjacent bars of the various converter units with a smaller mutual spacing than those conductor bars belonging to the same unit. Thus the magnetic linkage of the direct current bus bars of the faulty converter unit will be increased by the magnetic flux of the bus bars of the properly operating units when reverse short circuit currents occur.

In such an installation, the conductor bars are arranged in the same plane as much as possible and the individual poles are alternately disposed side by side. The spacing of the lines of various converter groups, disposed thus side-by-side, is made suitably smaller than the thickness of the bundle of bars forming the conductor bars. The conductor bars belonging to the same group show a spacing which is larger than said thickness.

The invention will now be described in greater particularity and with reference to the appended drawing, in which:

Fig. 1 illustrates an installation according to the invention, and

Figs. 2 and 3 indicate the operation achieved by reverse short-circuits in various converter groups.

Fig. 1 represents a heavy current contact converter installation with three converter groups 1, 2, 3. On the direct current side of these groups, the conductor bars 4 to 9 lead to the positive and negative direct current collector bars or mains 10 and 11. The arrangement of the conductor bars is effected in such a way that two conductor rails which do not belong to the same group—thus, 5 and 6; or, 7 and 8—are always arranged side-by-side, and the spacing 12 is smaller than the thickness of the bundle of bars 13. The two conductor bars—4 and 5; or, 6 and 7—belonging to the same group, have a larger spacing than the thickness of the bundle of bars. It should be mentioned that for simplicity only the individual bars 4, 7, 8 and 9 of the corresponding bus bar bundles have been illustrated in the drawings.

Fig. 2 shows the magnetic field lines for an installation with five contact converter groups 14–18, when a reverse short-circuit occurs in the middle group 16. The conductor bars, associated with each group, are designated by the reference numerals 19 to 28. The directions of current in the bars are designated with crosses and points, and the current flows from the front to the rear where there is a cross, while a point designates an inverse direction. The field lines plotted show the congestion between the lines of the defective converter group so that there appears a great increase in the inductivity which limits the short-circuit current.

There is assumed in Fig. 3 that a reverse short-circuit current occurs in the converter group 14. Even in this case the field lines are congested in the disturbed converter group and increase the inductivity therein. In this way it is possible to achieve by appropriate line displacement, without additional media, a restriction of the short circuit current when a reverse current occurs.

I claim:

1. In a heavy current contact converter power system having a plurality of contact converters electrically connected in parallel across positive and negative direct current collector mains, the invention wherein each of said contact converters has at least one first conductor bar connected to the positive main and at least one second conductor bar connected to the negative main, said second conductor bar being parallel to and spaced from said first conductor bar, said converters being arranged with their conductor bars mutually parallel and lying substantially in the same plane, the first bar of each converter being adjacent the second bar of the next adjacent converter and spaced therefrom over a greater portion of its length by a distance less than the spacing between the first and second bars of each converter, whereby reverse short-circuiting currents flowing in the conductor bars upon occurrence of a fault in one of the converters will be inductively attenuated by the magnetic linkages from the conductor bars of the properly functioning converters.

2. In a heavy current contact converter power system having a plurality of contact converter groups electrically connected in parallel across positive and negative direct current collector mains, the invention wherein each of said contact converter groups has a first bundle of conductor bars connected to the positive main and a second bundle of conductor bars connected to the negative main, the conductors of said second bundle being parallel to the conductors of the first bundle and being spaced from said first bundle, said converter groups being arranged with their conductor bars mutually parallel and lying substantially in the same plane, the first bundle of each converter group being adjacent and spaced from the second bundle of the next adjacent converter, the spacing between the first and second bundles of different converter groups being less than the thickness of the bundles of conductor bars and also less than the spacing between the first and second bundles of each converter group, whereby reverse short-circuiting currents flowing in the conductor bars upon occurrence of a fault in one of the converter groups will be inductively attenuated by the magnetic linkages from the conductor bars of the properly functioning converter groups.

References Cited in the file of this patent

UNITED STATES PATENTS

| | | |
|---|---|---|
| 2,247,133 | Rees | June 24, 1941 |
| 2,297,170 | Rudd | Sept. 29, 1941 |